(No Model.)
F. S. MOORE.
PLOW.
No. 487,578. Patented Dec. 6, 1892.
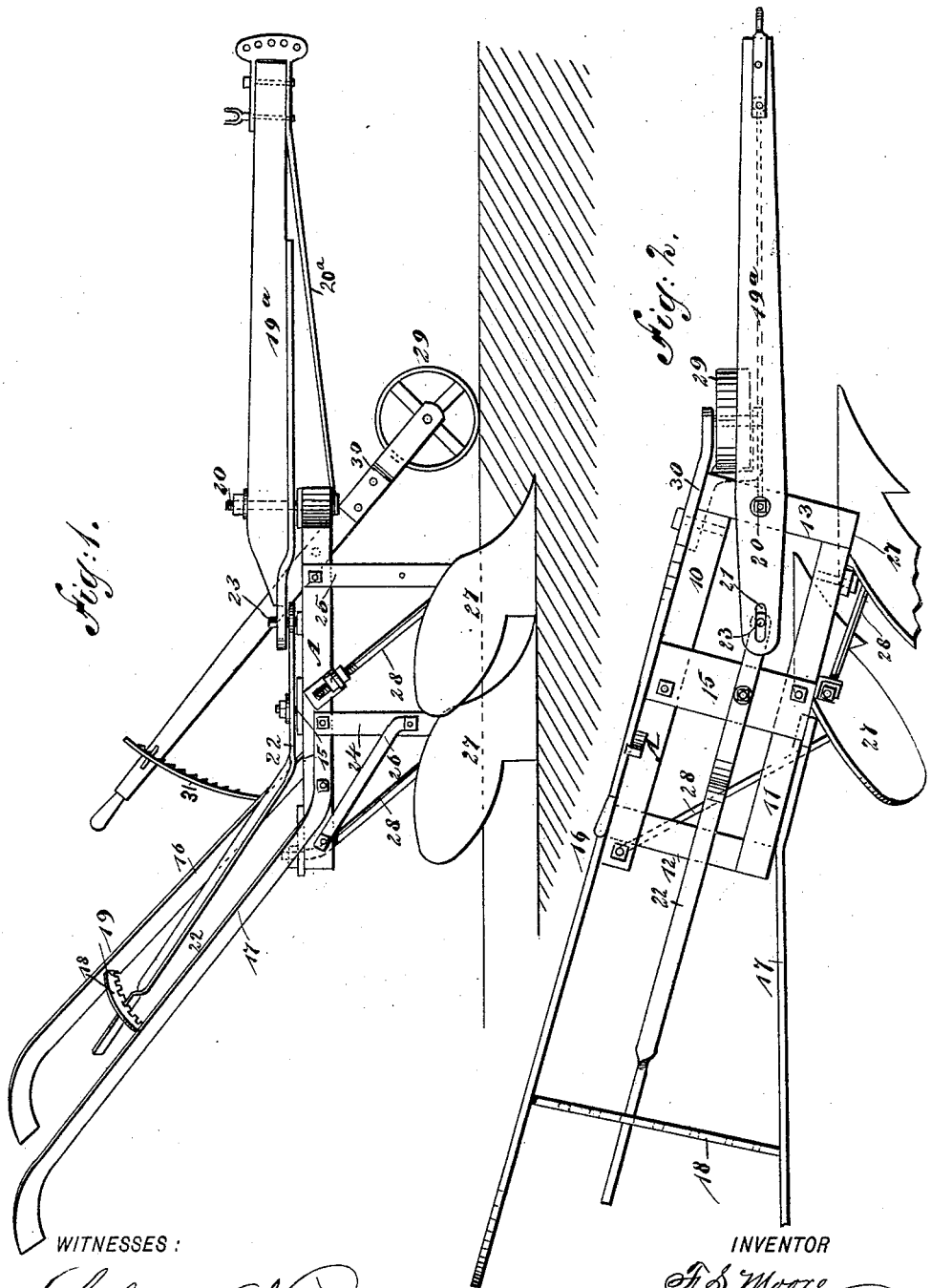
WITNESSES:
Chas. Nisis.
C. Sedgwick.
INVENTOR
F. S. Moore
BY
ATTORNEYS.

UNITED STATES PATENT OFFICE.

FREDERICK SIDNEY MOORE, OF HANFORD, CALIFORNIA.

PLOW.

SPECIFICATION forming part of Letters Patent No. 487,578, dated December 6, 1892.

Application filed May 11, 1892. Serial No. 432,651. (No model.)

*To all whom it may concern:*

Be it known that I, FREDERICK SIDNEY MOORE, of Hanford, in the county of Tulare and State of California, have invented a new and useful Improvement in Plows, of which the following is a full, clear, and exact description.

My invention relates to an improvement in plows, and has for its object to provide a plow adapted to carry one or a gang of shares.

A further object of the invention is to provide a plow especially adapted for use in vineyards and orchards and to so construct the implement that the draft may be expeditiously and conveniently changed from right to left by the manipulator of the plow, so that the near or off horse of a two or three horse team can walk in the furrow, thereby throwing the shares of the plow closer to the tree or vine under cultivation than can be done by plows ordinarily used for such purposes.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in both the views.

Figure 1 is a side elevation of the improved plow, and Fig. 2 is a plan view of the same.

In carrying out the invention the implement is provided with a body-frame A, somewhat rectangular in cross-section, comprising side beams 10 and 11, united by a front cross-bar 13, a rear cross-bar 12, and an intermediate cross plate or beam 15. This frame is adapted when the plow is in operation to sustain somewhat of a diagonal relation to the furrow or furrows to be created. Therefore a handle 16 is secured at what may be termed the "off" or "land" side of the frame, and this handle is straight, while a handle 17 is connected to the near side of the frame, and this handle extends outward from the frame in somewhat of a diagonal direction and away from the opposite handle 16. The two handles are connected by a rack-bar 18, which is preferably curved, the teeth 19 of the bar being produced in its under edge. The beam $19^a$ is fulcrumed by a pivot-pin 20 or its equivalent upon the front cross-bar 13, and the rear end of the beam does not reach the intermediate cross plate or beam 15. In order that the beam may be made very light, a truss-rod $20^a$ is attached to the lower end of the pivot-pin 20 and the clevis. The rear end of the beam has a slot 21 produced therein, somewhat elongated and longitudinally produced, and upon the cross plate or beam 15 the lower member of an angle-lever 22 is pivoted, the forward end of which lever is provided with a trip-pin 23, which pin extends upward through the slot 21 of the beam. This lever is usually made of a spring metal, and its upper member, which constitutes the handle, is somewhat twisted or so manipulated that an edge will be presented to the teeth of the rack-bar 18, and as the lever is of spring material it will normally enter at its handle end the spaces between the teeth of the rack-bar. It will be observed that by pressing the lever 22 down and shifting it from side to side the direction of the beam $19^a$, and consequently the draft of the plow, may be changed at will, so as to throw the shares, the position of which will be hereinafter described, more or less close to the vine or the tree to be cultivated.

Standards 24 and 25 are projected downward from what may be termed the "near" side of the plow-frame, the direction of the standards being vertical, and these standards may be connected, if in practice it is found desirable, and braced by bars 26, connected with the standards and the frame, one of said bars being shown in connection with the rear standard in Fig. 1 of the drawings. Each of these standards has connected therewith a plowshare 27, the shares being so arranged that their points will produce separate independent furrows—that is to say, one of the shares is located outside of the other. The landsides of these shares are adapted to be raised and lowered, and this is effected through the medium of adjusting-bars 28, a separate adjusting-bar being connected with the landside of each share, and when a gang of two shares is carried by the plow-frame the adjusting-bar connected with the forward share is at its upper end connected with the near side of the plow-frame, while the adjusting-bar attached to the rear share is connected with the landside of the frame, as shown in both Figs. 1 and 2. By this means the landsides may be raised and lowered.

The depth that the plowshares shall enter the ground is regulated by the land-gage 29, adapted to travel upon the ground at the landside of the furrows. This gage consists of a wheel having bearing in the lower end of the arm 30. This arm is fulcrumed upon the landside of the plow-frame, and its upper end extends some distance beyond the said frame and terminates at its upper end in a handle, the handle portion being adapted for engagement with a rack 31, located at the landside of the frame. The arm may be provided at the point it is to be pivoted with a series of apertures, thus rendering it adjustable, if desired.

It will be observed that a plow of this description is not only simple, but durable and economic, and that the draft of the plow may be instantly changed from right to left, so that, as heretofore stated, the near or off horse of a two or of a three horse team walking abreast is enabled to walk in the furrow, thereby throwing the shares as close as may be desired to the tree or vine which is the subject of cultivation.

Having thus described my invention, I claim as new and desire to secure by Letters Patent—

1. In a plow, the combination, with a share-carrying frame, of a beam pivoted to the forward part of the frame a short distance from its inner end and provided with a longitudinal slot in said inner end, an angle-lever fulcrumed on the frame and provided on its inner end with a pin working in the slot of the beam, and a rack between the handles and with which the upper end of the lever engages, substantially as described.

2. In a plow, the combination, with a frame and shares supported by the frame singly or in gangs, of a beam fulcrumed upon the frame, handles attached to the frame, one straight and the other outwardly inclined, a rack-bar connecting the handles, a lever fulcrumed upon the frame, the upper end of which is adapted for engagement with the rack-bar, the lower end being provided with a pin to enter the slot in the inner end of the beam, whereby the direction of the beam with respect to the frame may be changed, as and for the purpose set forth.

3. In a plow, the combination, with a frame, plowshares supported in gangs or singly from the frame, and a guide-arm fulcrumed upon the landside of the frame and carrying a gage-wheel, the said arm being adjustably connected with a support projected from the frame, of a beam fulcrumed upon the frame, the inner end of which is provided with a slot, a spring-lever likewise fulcrumed upon the frame, handles attached to the frame and carrying a rack adapted for engagement with one end of the lever, the other end of the lever being provided with a pin entering the slot in the plow-beam, and an adjustable connection between the landsides of the plowshares and the frame of the implement, as and for the purpose set forth.

FREDERICK SIDNEY MOORE.

Witnesses:
BENJ. C. MICKLE,
WM. R. McQUIDDY.